US010838070B1

(12) United States Patent
Chapman et al.

(10) Patent No.: US 10,838,070 B1
(45) Date of Patent: Nov. 17, 2020

(54) SYSTEMS AND METHODS FOR MANAGING GLOBAL NAVIGATION SATELLITE SYSTEM (GNSS) RECEIVERS

(71) Applicant: Rockwell Collins, Inc., Cedar Rapids, IA (US)

(72) Inventors: Mark D. Chapman, Central City, IA (US); Matthew D. Bousselot, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 280 days.

(21) Appl. No.: 15/939,210

(22) Filed: Mar. 28, 2018

(51) Int. Cl.
*G01S 19/21* (2010.01)
*G01S 19/03* (2010.01)
*G01S 19/00* (2010.01)

(52) U.S. Cl.
CPC .............. *G01S 19/21* (2013.01); *G01S 19/03* (2013.01)

(58) Field of Classification Search
CPC ....... G01S 19/21; G01S 19/03; G01C 25/005; G01C 21/16
See application file for complete search history.

(56) References Cited

U.S. PATENT DOCUMENTS

| 6,707,424 | B1* | 3/2004 | Snyder | G01S 19/11 |
| | | | | 342/357.29 |
| 7,400,956 | B1* | 7/2008 | Feller | G01S 19/14 |
| | | | | 342/357.36 |
| 8,271,194 | B2* | 9/2012 | Whitehead | G01C 15/00 |
| | | | | 342/357.26 |
| 8,686,900 | B2* | 4/2014 | Whitehead | G01S 19/14 |
| | | | | 342/357.27 |
| 2003/0214936 | A1* | 11/2003 | Goff | H04B 7/2693 |
| | | | | 370/350 |
| 2004/0054809 | A1* | 3/2004 | Goff | H04L 69/329 |
| | | | | 709/248 |
| 2004/0204852 | A1* | 10/2004 | Robbins | G01S 19/04 |
| | | | | 701/469 |
| 2004/0212533 | A1* | 10/2004 | Whitehead | G01S 19/14 |
| | | | | 342/357.36 |
| 2005/0116859 | A1* | 6/2005 | Miller | G01S 19/14 |
| | | | | 342/357.36 |
| 2005/0256637 | A1* | 11/2005 | Tazartes | G01C 21/16 |
| | | | | 701/408 |
| 2009/0121932 | A1* | 5/2009 | Whitehead | G01S 19/53 |
| | | | | 342/357.36 |

(Continued)

*Primary Examiner* — Bernarr E Gregory
(74) *Attorney, Agent, or Firm* — Suiter Swantz pc llo

(57) ABSTRACT

Embodiments of the inventive concepts disclosed herein are directed to systems and methods for managing global navigation satellite system (GNSS) receivers. A master GNSS receiver can receive, via an antenna system, a GNSS signal. The master GNSS receiver can determining, using the received GNSS signal, information including positioning, navigation and timing (PNT) or positioning, velocity and time (PVT) information. The master GNSS receiver can generate a master GNSS signal using a signal generator and the determined information, and a message indicating that the master GNSS signal is a trusted GNSS based signal. The master GNSS receiver can communicate, via a distribution hub, the generated master GNSS signal and the message to a plurality of GNSS receivers co-located with the master GNSS receiver, for recovering the PNT or PVT information from the master GNSS signal.

20 Claims, 3 Drawing Sheets

(56) References Cited

U.S. PATENT DOCUMENTS

| | | | | |
|---|---|---|---|---|
| 2009/0164067 A1* | 6/2009 | Whitehead | ............ | G01C 15/00 |
| | | | | 701/41 |
| 2009/0322600 A1* | 12/2009 | Whitehead | ............ | G01C 15/00 |
| | | | | 342/357.27 |
| 2010/0109944 A1* | 5/2010 | Whitehead | ............ | G01C 15/00 |
| | | | | 342/357.25 |
| 2011/0135308 A1* | 6/2011 | Tarlazzi | ............... | H04B 7/0413 |
| | | | | 398/79 |
| 2012/0056781 A1* | 3/2012 | Kong | ................... | G01S 19/252 |
| | | | | 342/357.42 |
| 2013/0188753 A1* | 7/2013 | Tarlazzi | .................... | H04L 5/14 |
| | | | | 375/299 |

* cited by examiner

ID# SYSTEMS AND METHODS FOR MANAGING GLOBAL NAVIGATION SATELLITE SYSTEM (GNSS) RECEIVERS

BACKGROUND

Many systems installed in surveillance or military vehicles for instance, use information from global navigation satellite system (GNSS) based signals, such as global positioning system (GPS) signals. Examples of such systems include navigation systems, satellite communications systems, and targeting or gun systems. Many such systems are each packaged or integrated with a GNSS based receiver. To improve the reception and processing of such signals, antennas with anti-jam capabilities are becoming increasingly useful or necessary for use with the GNSS based receivers. However, having multiple sets of anti-jam antenna systems, one for each system and accompanying GNSS based receiver, and installing these antenna antennas on the roof of a vehicle, can be very costly and inefficient. There are challenges to addressing this situation efficiently and cost-effectively.

SUMMARY

In one aspect, embodiments of the inventive concepts disclosed herein are directed to a method for managing global navigation satellite system (GNSS) receivers. A master GNSS receiver can receive, via an antenna system, a GNSS signal. The master GNSS receiver can determine using the received GNSS signal, information including positioning, navigation and timing (PNT) or positioning, velocity and time (PVT) information. The master GNSS receiver can generate a master GNSS signal using a signal generator and the determined information, and a message indicating that the master GNSS signal is a trusted GNSS based signal. The master GNSS receiver can communicate, via a distribution hub, the generated master GNSS signal and the message to a plurality of GNSS receivers co-located with the master GNSS receiver, for recovering the PNT or PVT information from the master GNSS signal.

In some embodiments, the plurality of GNSS receivers and the master GNSS receiver are co-located on a vehicle. The GNSS signal can include a global positioning system (GPS) signal including at least one of a course acquisition (C/A) code signal, a Y-code signal or an M-code signal, and the master GNSS signal includes a C/A code signal. The master GNSS receiver can generate the message by modulating, using a direct current (DC) modulator, a signal onto DC current supplied from at least one of the GNSS receivers or the master GNSS receiver via at least one coaxial link to the distribution hub.

In some embodiments, the signal generator can generate the message as a radio frequency signal within a bandwidth of the plurality of GNSS receivers. The master GNSS receiver can communicate the generated message and the master GNSS signal via a coaxial link to the distribution hub. The master GNSS receiver can communicate the PNT or PVT information from the master GNSS receiver via a data link to a system for consumption. The PNT or PVT information can be communicated from the plurality of GNSS receivers to a plurality of other systems for consumption. A navigation fusion element of the master GNSS receiver can generate the master GNSS signal based on at least one of: a signal generated according to the determined information, or information from one or more sensors.

In a further aspect, embodiments of the inventive concepts disclosed herein are directed to a method for managing global navigation satellite system (GNSS) receivers. A plurality of GNSS receivers can be co-located with a master GNSS receiver. The plurality of GNSS receivers can receive, from the master GNSS receiver via a distribution hub, a master GNSS signal and a message indicating that the master GNSS signal is a trusted GNSS based signal. The master GNSS signal can be generated from information including positioning, navigation and timing (PNT) or positioning, velocity and time (PVT) information. Each of the plurality of GNSS receivers can determine that the received master GNSS signal is a trusted GNSS based signal, responsive to the received message. Each of the plurality of GNSS receivers can recover, responsive to the determination that the received master GNSS signal is a trusted GNSS based signal, the PNT or PVT information from the received master GNSS signal. Each of the plurality of GNSS receivers can communicate the PNT or PVT information produced from the received master GNSS signal, and/or an indication that the source of the PNT or PVT information is a trusted source, to a plurality of systems for consumption.

In some embodiments, the plurality of GNSS receivers and the master GNSS receiver can be co-located on a vehicle. The master GNSS signal can be a global positioning system (GPS) signal including a course acquisition (C/A) code signal. A direct current (DC) detector of one of the plurality of GNSS receivers can receive the message as a signal modulated onto DC current supplied by at least one of the GNSS receivers or the master GNSS receiver, via at least one coaxial link to the distribution hub.

In some embodiments, a program, in communication with the current detector and executing on the one of the plurality of GNSS receivers, can determine that the message indicates that the master GNSS signal is a trusted GNSS based signal. Each of the plurality of GNSS receivers can receive the message and the master GNSS signal via a corresponding coaxial link with the distribution hub. The message can include a radio frequency signal within a bandwidth of the plurality of GNSS receivers. A program, executing on one of the plurality of GNSS receivers and in communication with a decoder for processing the message, can determine that the message indicates that the master GNSS signal is a trusted GNSS based signal. Each of the plurality of GNSS receivers can communicate that the recovered PNT or PVT information is based on a trusted GNSS based signal.

In yet another aspect, embodiments of the inventive concepts disclosed herein are directed to a system for managing global navigation satellite system (GNSS) receivers. The system can include a distribution hub. A master GNSS receiver can be co-located with the distribution hub and a plurality of GNSS receivers. The master GNSS receiver can receive a GNSS signal. The master GNSS receiver can determine, using the received GNSS signal, information including positioning, navigation and timing (PNT) or positioning, velocity and time (PVT). The master GNSS receiver can generate a master GNSS signal using a signal generator and the PNT or PVT information, and a message indicating that the master GNSS signal is a trusted GNSS based signal. The master GNSS receiver can communicate, via the distribution hub, the generated master GNSS signal and the message to the plurality of GNSS receivers for recovering the PNT or PVT information from the master GNSS signal.

In some embodiments, a direct current (DC) modulator can generate the message by modulating a signal onto DC current supplied by at least one of the GNSS receivers or the master GNSS receiver via at least one coaxial link connected to the distribution hub. The signal generator can generate the message as a radio frequency signal within a bandwidth of the plurality of GNSS receivers. The generated message and the master GNSS signal can be communicated via a coaxial link to the distribution hub for distribution to the plurality of GNSS receivers. The master GNSS receiver can communicate the generated master GNSS signal and the message to the distribution hub via a coaxial link. An anti-jam antenna system (AJAS) can receive the GNSS signal from a satellite.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
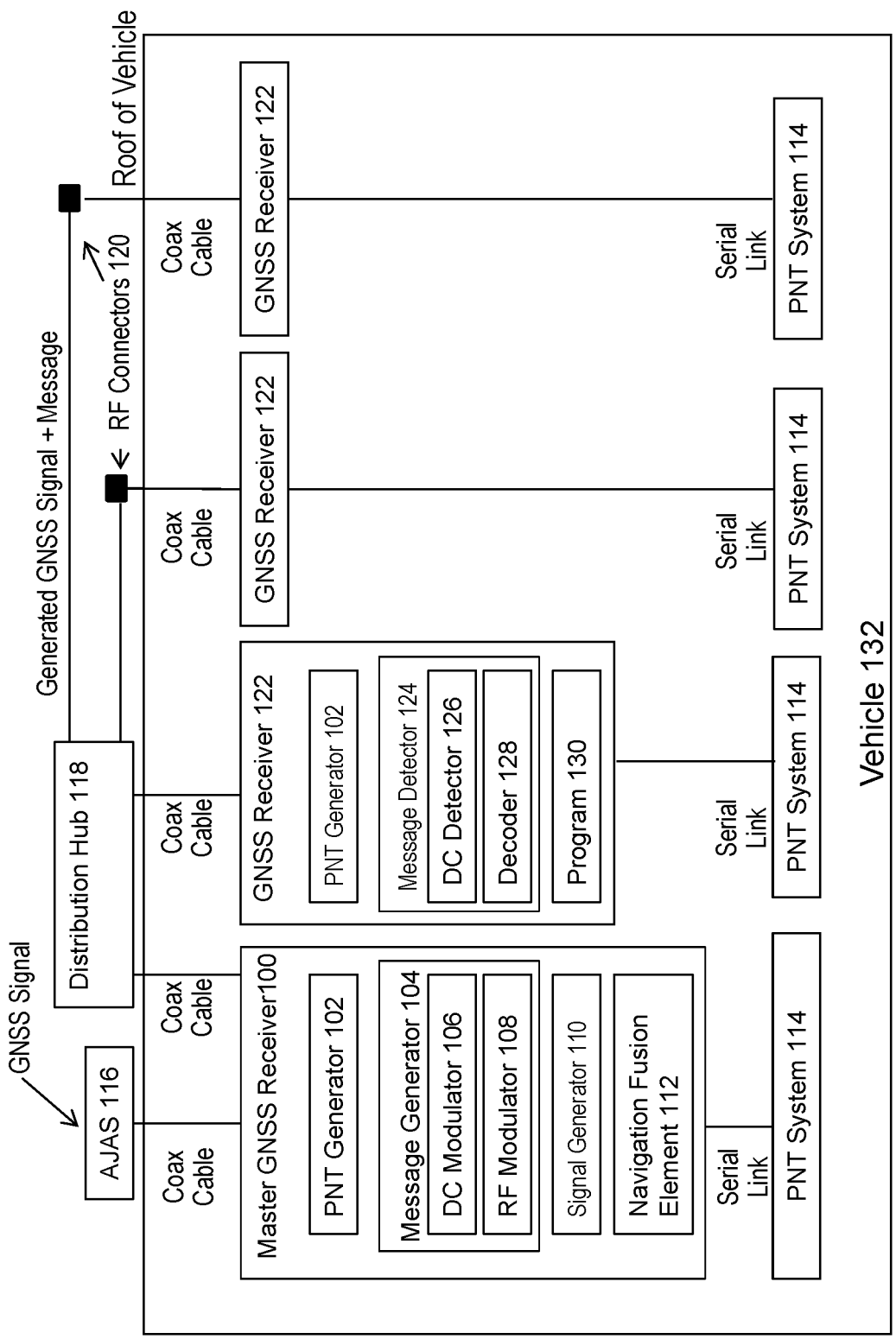
FIG. 1 is a block diagram of an example embodiment of a system for managing GNSS based receivers in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to systems and methods for managing a plurality of GNSS based receivers, while using GNSS based signals received via a single anti-jam antenna system (AJAS) for instance. GNSS can include GPS, GLONASS, Galileo, Beidou and other regional systems. As such, GNSS based signals (sometimes referred to as GNSS signals) can refer to GPS, GLONASS, Galileo, Beidou or other such satellite related signals, and GNSS based receivers (sometimes referred to as GNSS receivers) can refer to GPS, GLONASS, Galileo, Beidou or other such satellite related signal receivers.

Since many systems in surveillance or military vehicles (e.g., navigation systems, satellite communications systems, and targeting or gun systems) can rely on received GNSS signals, providing anti-jam capabilities can significantly improve system performance in environments characterized by jamming or interference activities. An AJAS can perform anti-jamming on received satellite signals before sending the signals to a GNSS receiver to extract PNT/PVT information. The AJAS can also convey signal characteristics in the satellite signals (e.g., M-code or Y-code signals) to the GNSS receiver, to provide an indication of assurance and integrity for PNT/PVT information derived from the satellite signals. Thus, the use of an AJAS with a GNSS receiver is becoming increasingly necessary for assured PNT or PVT information in critical applications, such as surveillance and military applications.

Having multiple sets of anti-jam antennas or AJAS, one for each system and accompanying GNSS based receiver, and installing these antennas on the roof of a vehicle or other operations platform, can be very inefficient or expensive. In accordance with some aspects of the inventive concepts disclosed herein, a single AJAS can be used to remove jammers and interference from the received satellite signals. The satellite signals, after removal or reduction of jammers and interference, can then serve as a source or basis for PNT or PVT information to be derived in a plurality of GNSS receiver. In one example implementation, for versatile multi-product applications, an AJAS can incorporate a GNSS receiver into the AJAS' antenna electronics package to eliminate the need for a specialized radio-frequency (RF) interface between the AJAS and the GNSS receiver. The GNSS receiver (sometimes referred to as a master GNSS receiver) can output PNT/PVT information, which is then transferred out via a data link such as a serial link (e.g., instead of via RF, in the absence of an RF interface). The PNT or PVT information (sometimes referred to a PNT or PVT solution) as obtained in the GNSS receiver can be provided to any number of systems that can use or need to use the PNT or PVT information (sometimes generally referred to as a PNT systems). However, these systems are coupled to their own GNSS receivers, via data links such as serial or Ethernet links. Such data links connecting the systems can be replaced with longer links (e.g., serial or Ethernet), so that each system can connect directly to a single master GNSS receiver for instance. However, the cost of replacing and reconnecting the data links in this manner can be prohibitive in cost and effort. Moreover, GNSS receivers (e.g., Defense Advanced GPS Receiver (DAGR) or Ground-Based GPS Receiver Application Module (GB-GRAM)) may not have spare data/serial/Ethernet links that can be used to connect to the master GNSS receiver, without reducing the capabilities that users and installation requirements are counting on to be available. Similarly, such a master GNSS receiver would have to have multiple data/serial/Ethernet ports to support multiple links to the downstream GNSS receivers.

In accordance with certain aspects of the inventive concepts disclosed herein, the PNT or PVT information obtained in the master GNSS receiver can be reformulated or formed into a GNSS signal (sometimes referred to as a master GNSS signal), and propagated to multiple GNSS receivers coupled to PNT systems. Each of the latter GNSS receivers can then extract the PNT or PVT information and provide this information to their respective PNT systems (e.g., navigation or satellite communication system) for use. The PNT or PVT information can be modulated into a C/A code signal (master GNSS signal) for transfer to multiple GNSS receivers. However, in transmitting the C/A code instead of a Y-code or M-code, each of the receiving GNSS receivers can be unable to perceive and reflect to a user that the true source of the extracted PNT or PVT information is encrypted Y-code or M-code. Therefore, in accordance with certain aspects of the inventive concepts disclosed herein, the master GNSS signal (C/A code) can be transmitted to the multiple GNSS receivers with a message indicating that the master GNSS signal is a trusted GNSS based signal, and/or that the PNT or PVT information is derived from a trusted GNSS based signal, and/or that the PNT or PVT information meets a required accuracy, quality or standard for consumption or usage.

Referring to FIG. 1, one example embodiment of a system for managing global navigation satellite system (GNSS) receivers is depicted. The system can include a master GNSS receiver 100, which can include a PNT generator 102, a message generator 102 (which can include a DC modulator 106 and/or an RF modulator 108), a signal generator 110, and/or a navigation fusion element 112. The system can include a PNT system that receives PNT/PVT information from the master GNSS receiver 100, an AJAS 116, a distribution hub 118, one or more RF connectors 120, and/or one or more GNSS receivers 122. Each of the GNSS receivers 122 can include a PNT generator 102, a message detector 124 (which can include a DC detector 126 and/or a decoder 128), and/or a program 130. The system can be hosted on a vehicle 132 (e.g., any land based, water-based, airborne or space vehicle, or an electric or autonomous vehicle), a robotic entity, a building (e.g., station, communications center, command center), or on any operations platform (e.g., mobile operations center or module).

Each of the above-mentioned elements or entities (and others disclosed herein) is implemented in hardware, or a combination of hardware and software. For instance, some of these elements or entities can include any application, program, library, script, task, service, process or any type and form of executable instructions executing on hardware of the system. The hardware includes circuitry such as one or more processors, memory devices, connections or bus structures, and/or communication interfaces, in one or more embodiments.

The AJAS 116 can include one or more antenna elements, which can be steerable, and arranged in an antenna array for instance. The AJAS 116 can receive satellite signals, such as GNSS signals, from one or more satellites. At least part of the AJAS 116 can be mounted on a roof portion of the vehicle 132, to facilitate reception of the GNSS signals. The AJAS 116 can include anti-jamming and/or interference removal mechanisms, for example to calculate spatial weights to configure its antenna elements to null or remove jamming signals. The AJAS 116 can null, reduce or remove jamming and/or interference signals in a received GNSS signal. The AJAS 116 can perform beamforming with its antenna elements to increase or improve reception of the GNSS signal. The GNSS signal can include a public, civilian, clear or open signal (sometimes generally or illustratively referred to as a C/A code signal or a civilian signal) and/or an encrypted signal (e.g., an M-code or Y-code signal, for military use for instance). The encrypted signal can include or incorporate signal characteristics that can be used to provide an indication of assurance and integrity in PNT/PVT information derived or determined from the encrypted signal. The AJAS 116 can send the received GNSS signal (e.g., after removing or reducing jamming and/or interference signals) to the master GNSS receiver 100, via a communications link such as a coaxial cable.

The master GNSS receiver 100 can receive the GNSS signal from the AJAS 116. The master GNSS receiver 100 can include a PNT generator 102, that can convert the received GNSS signal into PNT/PVT information. The PNT generator 102 can determine, extract, calculate, solve, obtain or otherwise generate the PNT/PVT information (and/or a time pulse) using or according to the received GNSS signal (e.g., using the C/A code signal, and/or the encrypted signal). For instance, the PNT generator 102 can include cryptographic hardware and/or software to decrypt the encrypted signal. The master GNSS receiver 100 can provide the PNT/PVT information (generated based on the received GNSS signal), and/or the time pulse, to a PNT system 114 via a data link (e.g., a serial or Ethernet link) for consumption or use. The master GNSS receiver 100 (or PNT generator 102) can send or transmit the PNT/PVT information via a network interface or cable connector interface of the master GNSS receiver 100, for instance. The master GNSS receiver 100 or PNT generator 102 can detect the signal characteristics (e.g., of the encrypted signal) and use (or rely on) it to provide the PNT system 114 with an indication of assurance and integrity in the generated PNT/PVT information, that the information is derived from a trusted source or GNSS signal.

The master GNSS receiver 100 can include a signal generator 110. The signal generator 110 can construct/reconstruct, produce or generate a GNSS signal using or according to the generated PNT/PVT information. The generated GNSS signal may include a C/A code signal that is the same or substantially the same as the C/A code signal in the received GNSS signal. The generated GNSS signal may exclude any encrypted signal, e.g., the encrypted signal in the received GNSS signal. For example, the generated GNSS signal may exclude any Y-code or M-code signal (as well as accompanying signal characteristics that can be used to provide an indication of assurance and integrity in PNT/PVT information to be derived or determined from such Y-code or M-code signal). In some embodiments, the master GNSS receiver 100 (or signal generator 110) can transmit the generated GNSS signal to one or more GNSS receivers 122. For example, the signal generator 110 can transmit the generated GNSS signal via an interface of the master GNSS receiver 100, through a link (e.g., coaxial cable) connected to the distribution hub 118, which can be an RF splitter or signal splitter for instance. The generated GNSS signal can be referred to as a master GNSS signal, to be shared with the one or more GNSS receivers 122 via a communications network that includes the distribution hub 118 for instance.

In some embodiments, the master GNSS receiver 100 is a system that includes a GNSS receiver 122 as one of the components of the system. The master GNSS receiver 100 may include the signal generator 122 as another component, connected to the GNSS receiver 122 via a data link (e.g., a serial link or an Ethernet link) for example. The GNSS receiver 122 of the master GNSS receiver 100 can send the generated PNT/PVT information to the signal generator 122, and can instruct the signal generator 122 to generate the GNSS signal (e.g., master GNSS signal). For example, the PNT/PVT information can be modulated or converted into a C/A code signal for transfer to multiple GNSS receivers 122.

In some embodiments, the master GNSS receiver 100 is a system that can include the navigation fusion element 112 as a component, in communication with other components such as the signal generator 122 and/or the GNSS receiver of the master GNSS receiver 100. The navigation fusion element 112 can communicate with such component(s) over one or more data links (e.g., serial or Ethernet links). The navigation fusion element 112 can receive and/or accept the generated GNSS signal from the signal generator 122. The navigation fusion element 112 can receive or access sensor information from one or more sensors, for example, sensor information from inertial measuring unit(s), barometer(s), and/or air speed sensor(s). The navigation fusion element 112 can receive or access sensor information from other devices or sources, such as from a storage device, or a signal processor. The navigation fusion element 112 can combine, incorporate or fuse the sensor information into/with the generated GNSS signal, to output or generate a master GNSS signal that can be shared with multiple other GNSS receivers 122. The master GNSS signal can be an enhanced, improved, higher quality or updated version relative to the generated GNSS signal.

The navigation fusion element 112 can enhance, improve, supplement or update at least a portion of the generated GNSS signal using the sensor information, to produce the master GNSS signal. For example, the navigation fusion element 112 can supplement any available portion of the generated GNSS signal (e.g., which can be absent or limited due to weak, degraded or denied GNSS reception, and/or due to interference), using the sensor information, to produce the master GNSS signal. In the absence of the generated GNSS signal, the navigation fusion element 112 can produce a master GNSS signal (e.g., for at least a period of time) using the available sensor data. This can allow for continued and/or acceptable operation of the master GNSS receiver 100, the plurality of GNSS receivers 122 and/or the PNT systems 114, for at least a period of time. The navigation fusion element 112 can verify or check at least a portion of the generated GNSS signal using the sensor information. In some cases, the navigation fusion element 112 may maintain the generated GNSS signal (e.g., not update or modify the generated GNSS signal), based on the available sensor data or lack of available sensor data. The navigation fusion element 112, the master GNSS receiver 100 and/or the signal generator 110 can transmit or send the master GNSS signal to one or more GNSS receivers 122. For example, the navigation fusion element 112 can send the master GNSS signal directly through a link (e.g., coaxial cable) connected to the distribution hub 118, or send the master GNSS signal via an interface of the master GNSS receiver 100 through a link connected to the distribution hub 118.

The master GNSS receiver 100 can include a message generator 104, sometimes referred to as an assurance message generator or assurance message modulator. The master GNSS receiver 100 can be a system that includes the message generator 104 as one component that can be communicatively connected (e.g., via serial link(s) or otherwise) to one or more other components of the system. The message generator 104 can be designed or implemented to generate a message (sometimes referred to as an assurance message) indicating that the master GNSS signal is a trusted or assured GNSS based signal. Since the master GNSS signal does not include an encrypted (Y-code or M-code) signal which carries signal characteristics that can be used to provide an indication of assurance and integrity in PNT/PVT information to be derived or determined from the encrypted signal, the assurance message can provide a similar function to provide an indication of assurance and integrity in the PNT/PVT information to be derived or determined from the master GNSS signal.

The assurance message can provide a receiving/destination device (e.g., a GNSS receiver 122 or PNT system 114) with an indication of assurance and integrity in the PNT/PVT information determined (or to be determined) from the master GNSS signal. In some embodiments, the assurance message provides the receiving/destination device with an indication of assurance that the PNT/PVT information is based on (or derived from) an encrypted (satellite) signal (e.g., a Y-code or M-code signal), e.g., as if the encrypted signal is received and processed at the master GNSS receiver 100 for example. For example, responsive to receiving the message, a GPS receiver 122 can indicate to a user that the source of its PNT/PVT information is based on C/A code, Y-code or M-code as appropriate, and that the PNT/PVT information meets a certain level of assurance and accuracy. To an external user, each of the GNSS receivers is acting as if it was directly receiving a satellite transmission (e.g., C/A code, Y-code or M-code) via an antenna system.

In some embodiments, reception of this assurance message with the master GNSS signal at a GNSS receiver 122 can cause the GNSS receiver 122 to proceed to determine PNT/PVT information using the open/unencrypted/civilian signal (e.g., C/A code) in the master GNSS signal, in the absence of an encrypted or military signal component (e.g., a Y-code or M-code signal), or responsive to determining that the master GNSS signal does not have such an encrypted or military signal component. Reception of this generated message can cause the GNSS receiver 122 to process (e.g., default to using) the open/unencrypted/civilian signal in the master GNSS signal, when the GNSS receiver 122 determines or detects the absence of an encrypted or military signal component in the master GNSS signal.

The message generator 104 can include a DC modulator 106 and/or a RF modulator 108. The DC modulator 106 can generate the assurance message by modulating a signal onto DC current supplied from at least one of the GNSS receivers 122 or the master GNSS receiver 100 via at least one coaxial link connected to the distribution hub 118. References to the use of coaxial link(s) in this disclosure are merely provided by way of illustration, and other types of links can be used to provide the indicated functions or characteristics. Each of the GNSS receivers 122 and/or the master GNSS receiver 100 can have a coaxial link that can connect to an antenna system or AJAS. The original purpose or use of each of these coaxial links may be to connect to an antenna system or AJAS, and to supply power to the antenna system or AJAS. The GNSS receiver 122 or master GNSS receiver 100 connected to such a coaxial link can supply DC power to the corresponding antenna or AJAS via the coaxial link, to power the corresponding antenna or AJAS. The GNSS receiver 122 or master GNSS receiver 100 connected to such a coaxial link can supply a DC current to the corresponding antenna or AJAS.

Instead of connecting an antenna or AJAS to a GNSS receiver 122, such a coaxial link can instead be used to connect the master GNSS receiver 100 to the GNSS receiver 122. Thus, instead of an antenna or AJAS sending a GNSS signal to a GNSS receiver 122, such a coaxial link can instead be used to send the master GNSS signal from the master GNSS receiver 100 to the GNSS receiver 122. To the GNSS receiver 122, the master GNSS receiver 100 may appear to be an AJAS or antenna system providing a satellite/GNSS signal to the GNSS receiver 122. To the GNSS receiver 122, the master GNSS signal can appear to be a satellite/GNSS signal directly output from an AJAS or antenna system. For instance as shown in FIG. 1, each GNSS receiver 122 can be connected via a coaxial cable to the roof of the vehicle 132, to a location where an antenna system (e.g., an AJAS) may previously be installed or located. Instead of having antenna systems at these roof locations, or replacing each of these with an AJAS (which can be expensive), the distribution hub 118 can occupy one of these locations and connect to a corresponding one of the GNSS receivers 122 as shown. The coaxial cables at the other roof locations can be extended to the distribution hub 118, by using RF connectors 120 and extension cables for instance. Hence existing installations and coaxial cables can be repurposed in this manner for each of the GNSS receivers 122 to receive a master GNSS signal from the master GNSS receiver 100, while using a single AJAS. With only one encryption-keyed GNSS receiver (e.g., the master GNSS receiver, connected to the AJAS) to process the encrypted satellite signal, the operational labor and encryption key management for multiple GNSS receivers is reduced.

One or more of the GNSS receivers 122 or the master GNSS receiver 100 can supply a DC current to the at least one coaxial link connected to the distribution hub 118. The DC modulator 106 can generate the assurance message by modulating a signal onto the DC current. The DC modulator 106 can modulate or incorporate a signal onto the DC current by varying a value of the DC current over time, or holding the value of the DC current at a specific value for at least a window of time, or setting the value of the DC current at particular values at corresponding times or windows of time (e.g., to form a digital sequence). For example, the DC modulator 106 can adjust or control a resistance of a component (e.g., in the master GNSS receiver 100) connected to the coaxial link, to adjust or modulate the DC current accordingly. The DC modulator 106 can adjust or control an input of a transistor to sink current from the coaxial link so as to adjust or modulate the DC current value to form the assurance message. The modulated DC current can form an assurance message (sometimes referred to as a DC modulated signal or DC modulated message) that can be detected at any of the GNSS receivers connected via the distribution hub 118 and coaxial links, and can provide an indication of assurance and integrity of a corresponding master GNSS signal.

Each of the GNSS receivers 122 can use a message detector 124 (in communication with a software program 130) to detect the assurance message. For instance, the message detector 124 can include a DC detector 126 to detect or receive the assurance message. For example, a GNSS receiver 122 such as a military GPS receiver (e.g., DAGR or GB-GRAM) can include circuitry for detecting a DC current on a coaxial cable connecting the GNSS receiver 122 to an antenna system, to support using the GNSS receiver 122 with an active antenna that is powered by the GNSS receiver 122. This circuitry can monitor the antenna DC current for presence of the antenna DC current, and whether the antenna DC current is within a correct range, as part of built in test (BIT) functionality for instance. This circuitry is capable of sensing changes in the DC current, and can operate as the DC detector 126. The circuitry's original purpose is to detect whether the GNSS receiver is connected to an external antenna or not, and can be repurposed to detect the assurance message, in accordance with inventive concepts disclosed herein. The DC modulator 106 of the master GNSS receiver 100 can alter the DC current being drawn, either as a constant alteration or as an alteration that follows a digital pattern for example. The DC detector 126 of the GNSS receiver 122 can be configured (e.g., via the software program 130 executing in the GNSS receiver 122) to recognize either the constant change or the digital pattern as the assurance message. The program 130 can be updated and uploaded to the GNSS receiver 122, to control, manage or interoperate with the message detector 124 or DC detector 126 to detect the assurance message.

The message generator 104 can include or use an RF modulator 108 to generate the assurance message. The RF modulator 108 can generate the assurance message as an RF signal within a bandwidth of the GNSS receivers 122. The RF modulator 108 can modulate the assurance message as a RF signal at GNSS (e.g., GPS) frequencies for example. The RF modulator 108 can tailor the assurance message to be recognizable by the GNSS receivers 122. The RF signal (sometimes referred to as a RF modulated signal or RF modulated message) can be sent with the master GNSS signal to each of the GNSS receivers 122, to provide an indication of assurance and integrity in the master GNSS signal. The RF modulator 108 can include or be part of the signal generator 110. The RF modulator 108 can place the RF signal (in addition to the master GNSS signal) on the coaxial link connecting the master GNSS receiver (or RF modulator 108) to the distribution hub 118, for transmission to each of the GNSS receivers 122.

Each of the GNSS receivers 122 can include a message detector 124 (in communication with a software program 130) to detect the assurance message or RF signal. For instance, the message detector 124 can include a decoder 128 to detect or receive the assurance message. The decoder can be part of the GNSS receiver 122 for detecting GNSS signals, which can be repurposed or extended (e.g., by the software program 130) to detect the assurance message in accordance with some of the inventive concepts disclosed herein. The decoder 126 of the GNSS receiver 122 can be configured (e.g., via the software program 130 executing in the GNSS receiver 122) to recognize the RF message (assurance message) received via the distribution hub 118 and coaxial cables. The program 130 can be updated and uploaded to the GNSS receiver 122, to control, manage or interoperate with the decode 128 or message detector 124 to detect the assurance message.

In some embodiments, the message generator 104 can send or provide the assurance message using both modes or formats, e.g., as a RF modulated signal and a DC modulated signal. The message detector 124 of each of the downstream GNSS receivers 122 can operate according to a configuration which indicates whether the message detector 124 should (a) detect the RF modulated signal, and decode the assurance message in the RF modulated signal, or (b) detect the DC modulated signal, and decode the assurance message in the DC modulated signal, or (c) do perform a combination of both. In some embodiments, the assurance message can be protected via authentication and/or encryption, which is supported by each associated message generator 104 and message detector 126.

Reception of this assurance message with the master GNSS signal at a GNSS receiver 122 can cause the GNSS receiver 122 to proceed to determine PNT/PVT information using the open/unencrypted/civilian signal (e.g., C/A code) in the master GNSS signal, even though the master GNSS signal does not have an encrypted or military signal component (e.g., a Y-code or M-code signal). The PNT generator 102 of the GNSS receiver 122 can use the master GNSS signal (e.g., C/A code) to determine the PNT/PVT information and/or output a time pulse, and provide the PNT/PVT information (and/or time pulse) to a corresponding PNT system that uses or consumes the PNT/PVT information. Based on the received assurance message, the GNSS receiver 122 can indicate (e.g., via standard signaling) to the corresponding PNT system 114 or a user that the PNT/PVT information is based on an encrypted signal (e.g., a Y-code or M-code signal) or trusted source.

Figure 2:
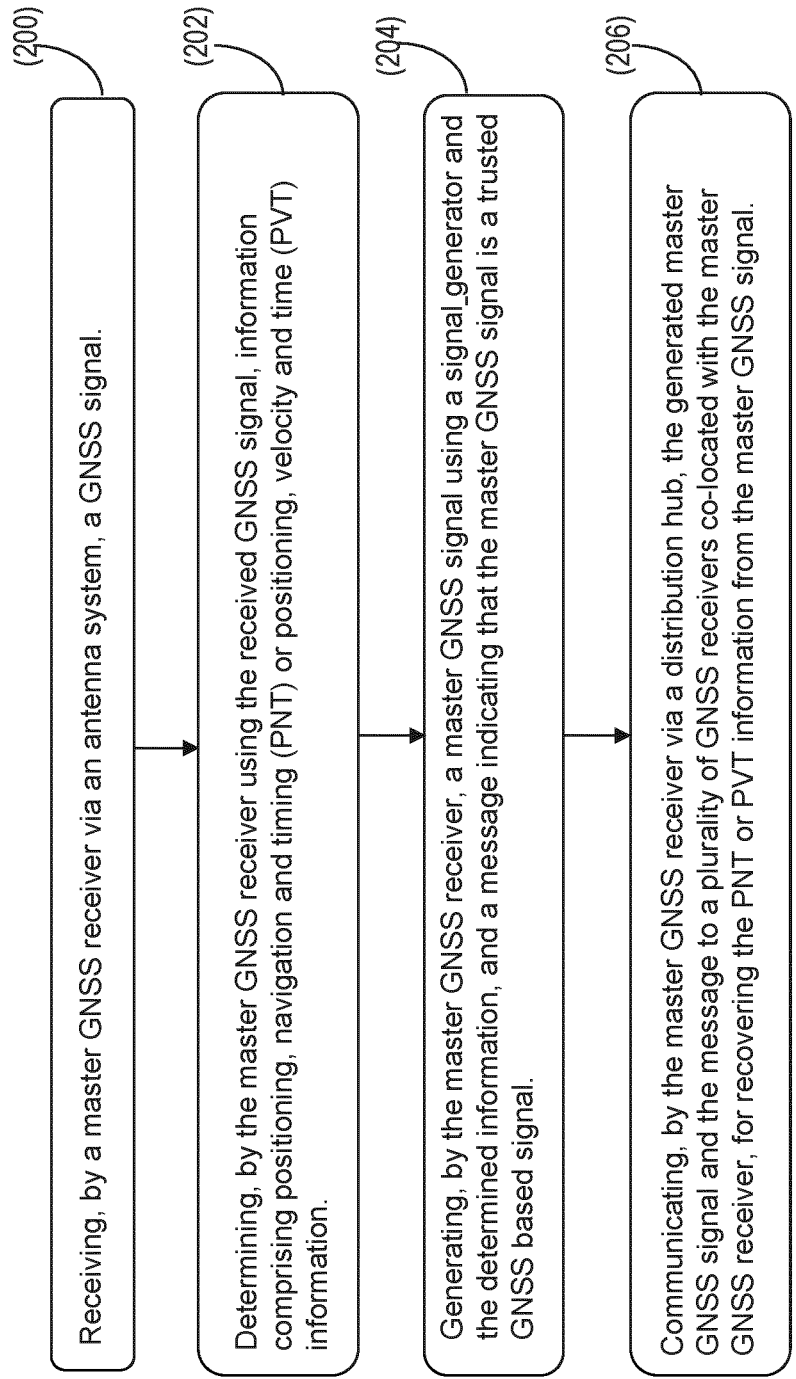
FIG. 2 shows a flow diagram of an example embodiment of a method for managing GNSS based receivers in accordance with some embodiments of the inventive concepts disclosed herein.

Referring now to FIG. 2, one embodiment of a method for managing global navigation satellite system (GNSS) receivers is depicted. The method includes receiving, by a master GNSS receiver via an antenna system, a GNSS signal (200). The master GNSS receiver can determine, using the received GNSS signal, information comprising positioning, navigation and timing (PNT) or positioning, velocity and time (PVT) information (202). The master GNSS receiver can generate a master GNSS signal using a signal generator and the determined information, and a message indicating that the master GNSS signal is a trusted GNSS based signal (204). The master GNSS receiver can communicate, via a distribution hub, the generated master GNSS signal and the message to a plurality of GNSS receivers co-located with the master GNSS receiver, for recovering the PNT or PVT information from the master GNSS signal (206).

Referring now to step 200, and in some embodiments, a master GNSS receiver receives a GNSS signal via an antenna system. The antenna system can include an AJAS 116. The antenna system can include one or more antenna elements, which can be steerable, and arranged in an antenna array for instance. The antenna system can receive satellite signals, such as GNSS signals, from one or more satellites. At least part of the antenna system can be mounted on a roof portion of a vehicle 132, to facilitate reception of the GNSS signals. The antenna system can include anti-jamming and/or interference removal mechanisms, for example to calculate spatial weights to configure its antenna elements to null or remove jamming signals. The antenna system can null, reduce or remove jamming and/or interference signals in a received GNSS signal. The antenna system can perform beamforming with its antenna elements to increase or improve reception of the GNSS signal. The GNSS signal can include a public, civilian, clear or open signal (e.g., a C/A code signal) and/or an encrypted signal (e.g., an M-code or Y-code signal). The antenna system can send the received GNSS signal (e.g., after removing or reducing jamming and/or interference signals) to the master GNSS receiver 100, via a communications link such as a coaxial cable. The master GNSS receiver 100 can detect and receive the GNSS signal from the antenna system.

Referring now to step 202, and in some embodiments, the master GNSS receiver can determine, using the received GNSS signal, information comprising positioning, navigation and timing (PNT) or positioning, velocity and time (PVT) information. The master GNSS receiver 100 can include a PNT generator 102, that can convert the received GNSS signal into PNT/PVT information. The PNT generator 102 can determine, extract, calculate, solve, obtain or otherwise generate the PNT/PVT information (and/or a time pulse) using or according to the received GNSS signal (e.g., using the C/A code signal, and/or the encrypted signal). For instance, the PNT generator 102 can include cryptographic hardware and/or software to decrypt the encrypted signal.

In some embodiments, the master GNSS receiver 100 can provide the PNT/PVT information, and/or the time pulse, to a PNT system 114 via a data link (e.g., a serial or Ethernet link) for consumption or use. The master GNSS receiver 100 (or PNT generator 102) can send or transmit the PNT/PVT information via a network interface or cable connector interface of the master GNSS receiver 100, for instance. The master GNSS receiver 100 or PNT generator 102 can detect the signal characteristics (e.g., of the encrypted signal) and use (or rely on) it to provide the PNT system 114 with an indication of assurance and integrity in the generated PNT/PVT information, that the information is derived from a trusted source or GNSS signal.

Referring now to step 204, and in some embodiments, the master GNSS receiver can generate a master GNSS signal using a signal generator and the determined information, and a message indicating that the master GNSS signal is a trusted GNSS based signal. The master GNSS receiver 100 can include a signal generator 110. The signal generator 110 can construct/reconstruct, produce or generate a GNSS signal using or according to the generated PNT/PVT information. The generated GNSS signal may include a C/A code signal that is the same or substantially the same as the C/A code signal in the received GNSS signal. The generated GNSS signal may exclude any encrypted signal, e.g., the encrypted signal in the received GNSS signal. For example, the generated GNSS signal may exclude any Y-code or M-code signal. The generated GNSS signal can be referred to as a master GNSS signal, to be shared with the one or more GNSS receivers 122.

In some embodiments, the master GNSS receiver 100 is a system that can include the navigation fusion element 112 as a component, in communication with one or more components such as the signal generator 122. The navigation fusion element 112 can communicate with the signal generator 122 over one or more data links (e.g., serial or Ethernet links). The navigation fusion element 112 can receive and/or accept the generated GNSS signal from the signal generator 122. The navigation fusion element 112 can receive or access sensor information from one or more sensors, for example, sensor information from inertial measuring unit(s), barometer(s), and/or air speed sensor(s). The navigation fusion element 112 can receive or access sensor information from other devices or sources, such as from a storage device, or a signal processor. The navigation fusion element 112 can combine, incorporate or fuse the sensor information into/with the generated GNSS signal, to output or generate a master GNSS signal that can be shared with multiple other GNSS receivers 122. The master GNSS signal can be an enhanced, improved, higher quality or updated version relative to the generated GNSS signal. The navigation fusion element 112 can enhance, supplement, improve or update at least a portion of the generated GNSS signal using the sensor information, to produce the master GNSS signal. For example, the navigation fusion element 112 can supplement any available portion of the generated GNSS signal (e.g., which can be absent or limited due to weak, degraded or denied GNSS reception, and/or due to interference), using the sensor information, to produce the master GNSS signal. In the absence of the generated GNSS signal, the navigation fusion element 112 can produce a master GNSS signal (e.g., for at least a period of time) using the available sensor data. This can allow for continued and/or acceptable operation of the master GNSS receiver 100, the plurality of GNSS receivers 122 and/or the PNT systems 114, for at least a period of time. The navigation fusion element 112 can verify or check at least a portion of the generated GNSS signal using the sensor information. In some cases, the navigation fusion element 112 may maintain the generated GNSS signal (e.g., not update or modify the generated GNSS signal), based on the available sensor data or lack of available sensor data.

The master GNSS receiver can generate a message (or assurance message) indicating that the master GNSS signal is a trusted GNSS based signal. The master GNSS receiver 100 can include a message generator 104. The message generator 104 can generate the assurance message which indicates that the master GNSS signal is a trusted or assured GNSS based signal. The assurance message can provide an indication of assurance and integrity in the PNT/PVT information to be derived or determined from the master GNSS signal. The assurance message can provide a receiving/destination device (e.g., a GNSS receiver 122 or PNT system 114) with an indication of assurance and integrity in the PNT/PVT information determined (or to be determined) from the master GNSS signal. In some embodiments, the assurance message provides the receiving/destination device with an indication of assurance that the PNT/PVT information is based on (or derived from) an encrypted (satellite) signal (e.g., a Y-code or M-code signal), e.g., as if the encrypted signal is received and processed at the master GNSS receiver 100 for example. For example, responsive to receiving the message, a GPS receiver 122 can indicate to a user that the source of its PNT/PVT information is based on C/A code, Y-code or M-code as appropriate, and that the PNT/PVT information meets a certain level of assurance and accuracy.

The message generator 104 can include a DC modulator 106 and/or a RF modulator 108. The DC modulator 106 can generate the assurance message by modulating a signal onto DC current supplied from at least one of the GNSS receivers 122 or the master GNSS receiver 100 via at least one coaxial link connected to the distribution hub 118. One or more of the GNSS receivers 122 or the master GNSS receiver 100 can supply a DC current to the at least one coaxial link connected to the distribution hub 118. The DC modulator 106 can generate the assurance message by modulating a signal onto the DC current. The DC modulator 106 can modulate or incorporate a signal onto the DC current by varying a value of the DC current over time, or holding the value of the DC current at a specific value for at least a window of time, or setting the value of the DC current at particular values at corresponding times or windows of time (e.g., to form a digital sequence). For example, the DC modulator 106 can adjust or control a resistance of a component (e.g., in the master GNSS receiver 100) connected to the coaxial link, to adjust or modulate the DC current accordingly. The DC modulator 106 can adjust or control an input of a transistor to sink current from the coaxial link so as to adjust or modulate the DC current value to form the assurance message. The modulated DC current can form an assurance message (sometimes referred to as a DC modulated signal or DC modulated message) that can be detected at any of the GNSS receivers connected via the distribution hub 118 and coaxial links, and can provide an indication of assurance and integrity of a corresponding master GNSS signal.

The message generator 104 can include or use an RF modulator 108 to generate the assurance message. The RF modulator 108 can generate the assurance message as an RF signal within a bandwidth of the GNSS receivers 122. The RF modulator 108 can modulate the assurance message as a RF signal at GNSS (e.g., GPS) frequencies for example. The RF modulator 108 can tailor the assurance message to be recognizable by the GNSS receivers 122. The RF signal (sometimes referred to as a RF modulated signal or RF modulated message) can be sent with the master GNSS signal to each of the GNSS receivers 122, to provide an indication of assurance and integrity in the master GNSS signal. The RF modulator 108 can include or be part of the signal generator 110. The RF modulator 108 can place the RF signal (in addition to the master GNSS signal) on the coaxial link connecting the master GNSS receiver (or RF modulator 108) to the distribution hub 118, for transmission to each of the GNSS receivers 122.

Referring now to step 206, and in some embodiments, the master GNSS receiver can communicate, via a distribution hub, the generated master GNSS signal and the assurance message to a plurality of GNSS receivers co-located with the master GNSS receiver, for recovering the PNT or PVT information from the master GNSS signal. The message generator 104, the navigation fusion element 112, the master GNSS receiver 100 and/or the signal generator 110 can transmit or send the master GNSS signal and/or the assurance message to one or more GNSS receivers 122. For example, the navigation fusion element 112 can send the master GNSS signal directly through a link (e.g., coaxial cable) connected to the distribution hub 118, or send the master GNSS signal via an interface of the master GNSS receiver 100 through a link connected to the distribution hub 118. In some embodiments (e.g., where an navigation fusion element 112 is absent or inactive), the signal generator 110 can transmit or send the master GNSS signal through the distribution hub to one or more GNSS receivers 122.

The message generator 104 can send the assurance message in one or both modes (DC modulated signal, RF modulated signal), which can be indicated via a configuration. The configuration can be communicated to or agreed upon with the downstream GNSS receivers 122. The message generator 104 can send the assurance message concurrent with or proximate to the transmission of the master GNSS signal, or in a defined sequence, so that a downstream GNSS receiver 122 can determine that the assurance message pertains to (or is directed to) the master GNSS signal. The assurance message can include a reference to the master GNSS signal, or the master GNSS signal can include a reference to the assurance message, to relate one to the other.

Figure 3:
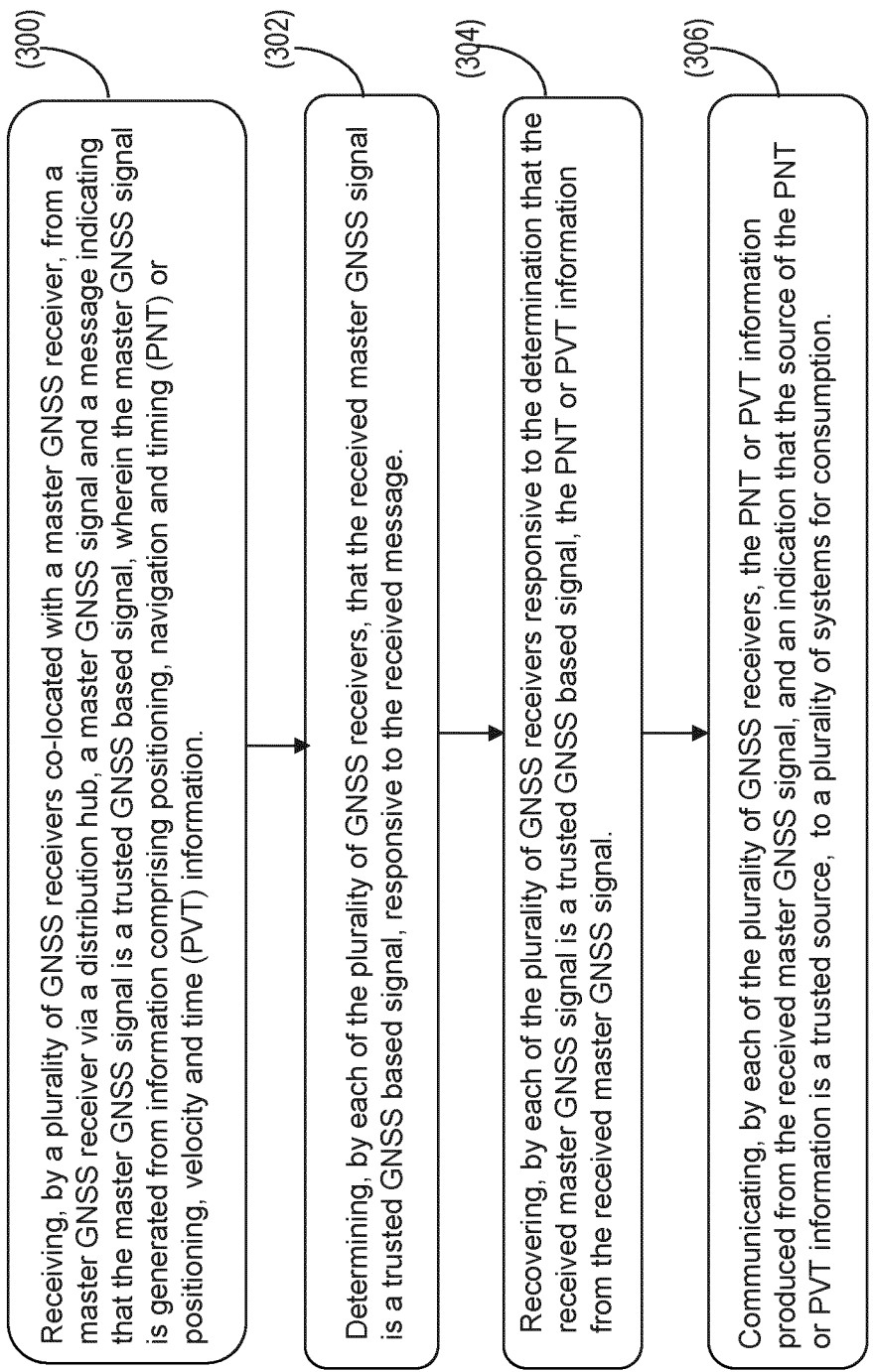
FIG. 3 shows a flow diagram of an example embodiment of a method for managing GNSS based receivers in accordance with some embodiments of the inventive concepts disclosed herein.

Referring now to FIG. 3, one embodiment of a method for managing global navigation satellite system (GNSS) receivers is depicted. The method includes receiving, by a plurality of GNSS receivers co-located with a master GNSS receiver, from a master GNSS receiver via a distribution hub, a master GNSS signal and a message indicating that the master GNSS signal is a trusted GNSS based signal (300). The master GNSS signal can be generated from information comprising positioning, navigation and timing (PNT) or positioning, velocity and time (PVT) information. Each of the plurality of GNSS receivers can determine that the received master GNSS signal is a trusted GNSS based signal, responsive to the received message (302). Each of the plurality of GNSS receivers can recover, responsive to the determination that the received master GNSS signal is a trusted GNSS based signal, the PNT or PVT information from the received master GNSS signal (304). Each of the plurality of GNSS receivers can communicate the PNT or PVT information produced from the received master GNSS signal, and/or an indication that the source of the PNT or PVT information is a trusted source, to a plurality of systems for consumption (306).

Referring now to step 300, and in some embodiments, a plurality of GNSS receivers, that is co-located with a master GNSS receiver, can receive from a master GNSS receiver via a distribution hub, a master GNSS signal and a message (or assurance) indicating that the master GNSS signal is a trusted GNSS based signal. The plurality of GNSS receivers and the master GNSS receiver can be co-located on a vehicle, or an operations platform or station for example. As discussed herein, the master GNSS signal can be generated from information comprising positioning, navigation and timing (PNT) or positioning, velocity and time (PVT) information. By way of example, the master GNSS signal can be a global positioning system (GPS) signal comprising a course acquisition (C/A) code signal. Each of the plurality of GNSS receivers can receive the assurance message and the master GNSS signal via a corresponding coaxial link connected to the distribution hub.

Each of the GNSS receivers 122 can use a message detector 124 (in communication with a software program 130) to detect the assurance message. For instance, the message detector 124 can include a direct current (DC) detector 126 to detect or receive the assurance message. This DC detector 126 can be capable of sensing changes in the DC current. The DC modulator 106 of the master GNSS receiver 100 can alter the DC current being drawn, either as a constant alteration or as an alteration that follows a digital pattern for example. The DC detector 126 of the GNSS receiver 122 can be configured (e.g., via the software program 130 executing in the GNSS receiver 122) to recognize either the constant change or the digital pattern as the assurance message. The program 130 can control, manage or interoperate with the message detector 124 or DC detector 126 to detect the assurance message. The DC detector of one of the plurality of GNSS receivers can receive the assurance message as a signal modulated onto DC current supplied by at least one of the GNSS receivers or the master GNSS receiver via at least one coaxial link to the distribution hub.

The assurance message can include a radio frequency (RF) signal transmitted within a bandwidth of the plurality of GNSS receivers. By way of example, the message detector 124 can include a decoder 128 to detect or receive the assurance message. The decoder can be part of the GNSS receiver 122 for detecting GNSS signals, which can be repurposed or extended (e.g., by the software program 130) to detect the assurance message in accordance with some of the inventive concepts disclosed herein. The decoder 126 of the GNSS receiver 122 can be configured (e.g., via the software program 130 executing in the GNSS receiver 122) to recognize the RF message (assurance message) received via the distribution hub 118 and coaxial cables. The program 130 can execute on the GNSS receiver 122 to control, manage or interoperate with the decode 128 or message detector 124 to detect the assurance message.

In some embodiments, the assurance message can include one or both signal modes or formats, e.g., RF modulated signal, DC modulated signal. The message detector 124 of each of the downstream GNSS receivers 122 can operate according to a configuration (communicated from, or predetermined with the master GNSS receiver) that indicates whether the message detector 124 should (a) detect the RF modulated signal, and decode the assurance message in the RF modulated signal, or (b) detect the DC modulated signal, and decode the assurance message in the DC modulated signal, or (c) do perform a combination of both. In some embodiments, the assurance message can be protected via authentication and/or encryption, which is supported by the message detector 126.

Referring now to step 302, and in some embodiments, each of the plurality of GNSS receivers can determine that the received master GNSS signal is a trusted GNSS based signal, responsive to the received message. For instance, the program 130, in communication with the message detector (e.g., DC detector 126 and/or RF signal decoder 128), and executing on a corresponding one of the plurality of GNSS receivers 122, can determine that the message indicates that the master GNSS signal is a trusted GNSS based signal or based on a trusted source. The DC detector 126 and/or RF signal decoder 128 can be controlled or managed by the program 130 to detect the assurance message and to determine that the assurance message indicates that the master GNSS signal is a trusted GNSS based signal or based on a trusted source. Responsive to receiving this assurance message with the master GNSS signal, a GNSS receiver 122 can proceed to determine PNT/PVT information using the open/unencrypted/civilian signal (e.g., C/A code) in the master GNSS signal, even though the master GNSS signal does not have an encrypted or military signal component (e.g., a Y-code or M-code signal). Based on the received assurance message, the GNSS receiver 122 can indicate (e.g., via standard signaling) to the corresponding PNT system 114 or a user that the PNT/PVT information is based on an encrypted signal (e.g., a Y-code or M-code signal) or a trusted source.

Referring now to step 304, and in some embodiments, each of the plurality of GNSS receivers can recover, responsive to the determination that the received master GNSS signal is a trusted GNSS based signal, the PNT or PVT information from the received master GNSS signal. The PNT generator 102 of the GNSS receiver 122 can use the master GNSS signal (e.g., C/A code) to determine the PNT/PVT information and/or output a time pulse. In some embodiments, if the message detector detects that the assurance message is absent, or can be corrupted or tampered with, the message detector can indicate to a corresponding PNT generator 102 to skip or bypass processing of the master GNSS signal to obtain PNT/PVT information and/or time pulse. In some embodiments, the message detector can determine if the assurance message is valid (e.g., authenticated or correctly decrypted). If the message detector detects that the assurance message is absent or invalid (e.g., can be corrupted or tampered with), the message detector can indicate (or instruct the PNT generator 102) to indicate to a user or a corresponding PNT system, that the PNT/PVT information may not be based on a trusted source.

Referring now to step 306, and in some embodiments, each of the plurality of GNSS receivers can communicate the PNT or PVT information produced from the received master GNSS signal, and/or an indication that the source of the PNT or PVT information is a trusted source, to a plurality of systems for consumption. For example, the PNT generator 102 of a corresponding GNSS receiver 122 can provide the PNT/PVT information (and/or time pulse) to a corresponding PNT system that uses or consumes the PNT/PVT information. Each of the plurality of GNSS receivers can communicate to the corresponding PNT system that the recovered PNT or PVT information is based on a trusted GNSS based signal, responsive to a valid received assurance message.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The present disclosure contemplates methods and systems for accomplishing various operations. The present disclosure also contemplates program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Some embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A method for managing global navigation satellite system (GNSS) receivers, comprising:
   receiving, by a master GNSS receiver via an antenna system, a GNSS signal;
   determining, by the master GNSS receiver using the received GNSS signal, information comprising positioning, navigation and timing (PNT) or positioning, velocity and time (PVT) information;
   generating, by the master GNSS receiver, a master GNSS signal using a signal generator and the determined information, and a message indicating that the master GNSS signal is a trusted GNSS based signal; and
   communicating, by the master GNSS receiver via a distribution hub, the generated master GNSS signal and the message to a plurality of GNSS receivers co-located with the master GNSS receiver, for recovering the PNT or PVT information from the master GNSS signal.

2. The method of claim 1, wherein the plurality of GNSS receivers and the master GNSS receiver are co-located on a vehicle.

3. The method of claim 1, wherein the GNSS signal comprises a global positioning system (GPS) signal comprising at least one of a course acquisition (C/A) code signal, a Y-code signal or an M-code signal, and the master GNSS signal comprises a C/A code signal.

4. The method of claim 1, comprising generating the message by modulating, using a direct current (DC) modulator, a signal onto DC current supplied from at least one of the GNSS receivers or the master GNSS receiver via at least one coaxial link to the distribution hub.

5. The method of claim 1, comprising:
   generating, by the signal generator, the message as a radio frequency signal within a bandwidth of the plurality of GNSS receivers; and
   communicating, by the master GNSS receiver, the generated message and the master GNSS signal via a coaxial link to the distribution hub.

6. The method of claim 1, comprising communicating the PNT or PVT information from the master GNSS receiver via a data link to a first system for consumption, and from the plurality of GNSS receivers to a plurality of other systems for consumption.

7. The method of claim 1, comprising generating, by a navigation fusion element of the master GNSS receiver, the master GNSS signal based on at least one of: a signal generated according to the determined information, or information from one or more sensors.

8. A method for managing global navigation satellite system (GNSS) receivers, comprising:
   receiving, by a plurality of GNSS receivers co-located with a master GNSS receiver, from the master GNSS receiver via a distribution hub, a master GNSS signal and a message indicating that the master GNSS signal is a trusted GNSS based signal, wherein the master GNSS signal is generated from information comprising positioning, navigation and timing (PNT) or positioning, velocity and time (PVT) information;
   determining, by each of the plurality of GNSS receivers, that the received master GNSS signal is a trusted GNSS based signal, responsive to the received message; and
   recovering, by each of the plurality of GNSS receivers responsive to the determination that the received master GNSS signal is a trusted GNSS based signal, the PNT or PVT information from the received master GNSS signal; and
   communicating, by each of the plurality of GNSS receivers, the PNT or PVT information produced from the received master GNSS signal, to a plurality of systems for consumption.

9. The method of claim 8, wherein the plurality of GNSS receivers and the master GNSS receiver are co-located on a vehicle.

10. The method of claim 8, wherein the master GNSS signal is a global positioning system (GPS) signal comprising a course acquisition (C/A) code signal.

11. The method of claim 8, comprising receiving, by a direct current (DC) detector of one of the plurality of GNSS receivers, the message as a signal modulated onto DC current supplied by at least one of the GNSS receivers or the master GNSS receiver via at least one coaxial link to the distribution hub.

12. The method of claim 11, comprising determining, by a program in communication with the current detector and executing on the one of the plurality of GNSS receivers, that the message indicates that the master GNSS signal is a trusted GNSS based signal.

13. The method of claim 8, comprising receiving, by each of the plurality of GNSS receivers, the message and the master GNSS signal via a corresponding coaxial link with the distribution hub, the message comprising a radio frequency signal within a bandwidth of the plurality of GNSS receivers.

14. The method of claim 13, comprising determining, by a program executing on one of the plurality of GNSS receivers and in communication with a decoder configured for processing the message, that the message indicates that the master GNSS signal is a trusted GNSS based signal.

15. The method of claim 8, comprising communicating, by each of the plurality of GNSS receivers, that the recovered PNT or PVT information is based on a trusted GNSS based signal.

16. A system for managing global navigation satellite system (GNSS) receivers, the system comprising:
   a distribution hub; and
   a master GNSS receiver co-located with the distribution hub and a plurality of GNSS receivers, the master GNSS receiver configured to:
      receive a GNSS signal;
      determine, using the received GNSS signal, information comprising positioning, navigation and timing (PNT) or positioning, velocity and time (PVT);
      generate a master GNSS signal using a signal generator and the PNT or PVT information, and a message indicating that the master GNSS signal is a trusted GNSS based signal; and
      communicate, via the distribution hub, the generated master GNSS signal and the message to the plurality of GNSS receivers for recovering the PNT or PVT information from the master GNSS signal.

17. The system of claim 16, further comprising a direct current (DC) modulator configured to generate the message by modulating a signal onto DC current supplied by at least one of the GNSS receivers or the master GNSS receiver via at least one coaxial link connected to the distribution hub.

18. The system of claim 16, wherein the signal generator is configured to generate the message as a radio frequency signal within a bandwidth of the plurality of GNSS receivers, the generated message and the master GNSS signal communicated via a coaxial link to the distribution hub for distribution to the plurality of GNSS receivers.

19. The system of claim 16, wherein the master GNSS receiver is configured to communicate the generated master GNSS signal and the message to the distribution hub via a coaxial link.

20. The system of claim 16, further comprising an anti-jam antenna system (AJAS) configured to receive the GNSS signal from a satellite.

* * * * *